US012780726B2

(12) United States Patent
Homma

(10) Patent No.: US 12,780,726 B2
(45) Date of Patent: Nov. 3, 2026

(54) RESIN COMPOSITION, METHOD FOR PRODUCING RESIN COMPOSITION, OPTICAL FIBER, METHOD FOR PRODUCING OPTICAL FIBER, OPTICAL FIBER RIBBON, AND OPTICAL FIBER CABLE

(71) Applicant: SUMITOMO ELECTRIC INDUSTRIES, LTD., Osaka (JP)

(72) Inventor: Yuya Homma, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 737 days.

(21) Appl. No.: 18/265,445

(22) PCT Filed: Dec. 6, 2021

(86) PCT No.: PCT/JP2021/044777

§ 371 (c)(1),
(2) Date: Jun. 6, 2023

(87) PCT Pub. No.: WO2022/138119

PCT Pub. Date: Jun. 30, 2022

(65) Prior Publication Data

US 2024/0116807 A1 Apr. 11, 2024

(30) Foreign Application Priority Data

Dec. 21, 2020 (JP) ................................ 2020-211203

(51) Int. Cl.

| | |
|---|---|
| ***C08F 2/46*** | (2006.01) |
| ***C03C 25/105*** | (2018.01) |
| ***C03C 25/1065*** | (2018.01) |
| ***C08F 2/50*** | (2006.01) |
| ***C08G 61/04*** | (2006.01) |

(52) U.S. Cl.

CPC ........ *C03C 25/105* (2013.01); *C03C 25/1065* (2013.01); *C03C 2218/32* (2013.01)

(58) Field of Classification Search

CPC .............. C03C 25/105; C03C 25/1065; C03C 2218/32; G02B 6/4403; G02B 6/4404; C08F 290/067; C08F 220/305; C08F 220/1811; C08F 220/36; C08F 226/02; C08F 230/085; C08G 18/48

USPC ........... 522/96, 90, 1, 6, 189, 184, 71; 520/1

See application file for complete search history.

(56) References Cited

U.S. PATENT DOCUMENTS

| | | | |
|---|---|---|---|
| 4,522,851 | A | 6/1985 | Rosthauser |
| 2017/0307815 | A1 | 10/2017 | Iwaguchi et al. |
| 2018/0373145 | A1 | 12/2018 | Shiraishi |
| 2021/0171691 | A1 | 6/2021 | Shinohara et al. |

FOREIGN PATENT DOCUMENTS

| | | | | | |
|---|---|---|---|---|---|
| JP | S61-021120 | A | | 1/1986 | |
| JP | 2000344844 | A | * | 12/2000 | |
| JP | 2005-314188 | A | | 11/2005 | |
| JP | 2009-197163 | A | | 9/2009 | |
| JP | 2010-235812 | A | | 10/2010 | |
| JP | 2012-111674 | A | | 6/2012 | |
| JP | 2013-501125 | A | | 1/2013 | |
| JP | 2013-136783 | A | | 7/2013 | |
| JP | 2014-114208 | A | | 6/2014 | |
| JP | 2017-119803 | A | | 7/2017 | |
| JP | 2017-141126 | A | | 8/2017 | |
| WO | WO-2008/076297 | A1 | | 6/2008 | |
| WO | WO-2008/076302 | A1 | | 6/2008 | |
| WO | WO-2011/049607 | A1 | | 4/2011 | |
| WO | WO-2017/082200 | A1 | | 5/2017 | |
| WO | WO-2019/138968 | A1 | | 7/2019 | |
| WO | WO-2019/151453 | A1 | | 8/2019 | |
| WO | WO-2019/159977 | A1 | | 8/2019 | |
| WO | WO-2020/045663 | A1 | | 3/2020 | |
| WO | WO-2021145103 | A1 | * | 7/2021 | ......... C08G 18/7621 |

OTHER PUBLICATIONS

Asano et al, JP 2000344844 Machine Translation, Dec. 12, 2000 (Year: 2000).*

Homma, WO 2021145103 Machine Translation, Jul. 22, 2021 (Year: 2021).*

* cited by examiner

*Primary Examiner* — Jessica Whiteley

(74) *Attorney, Agent, or Firm* — Faegre Drinker Biddle & Reath LLP

(57) ABSTRACT

A resin composition for primary coating of an optical fiber contains a photopolymerizable compound containing a difunctional urethane (meth)acrylate and a monofunctional urethane (meth)acrylate, and a photopolymerization initiator, the difunctional urethane (meth)acrylate is a reaction product of a diol, a diisocyanate, and a hydroxyl group-containing (meth)acrylate, and the monofunctional urethane (meth)acrylate is a reaction product of a polyoxyalkylene monoalkyl ether, a diisocyanate, and a hydroxyl group-containing (meth)acrylate, or a reaction product of a polyoxyalkylene monoalkyl ether and an isocyanate group-containing (meth)acrylate.

14 Claims, 6 Drawing Sheets

RESIN COMPOSITION, METHOD FOR PRODUCING RESIN COMPOSITION, OPTICAL FIBER, METHOD FOR PRODUCING OPTICAL FIBER, OPTICAL FIBER RIBBON, AND OPTICAL FIBER CABLE

TECHNICAL FIELD

The present disclosure relates to a resin composition for primary coating of an optical fiber, a method for producing the resin composition, the optical fiber, a method for producing the optical fiber, an optical fiber ribbon, and an optical fiber cable.

The present application claims the priority based on Japanese application No. 2020-211203, filed on Dec. 21, 2020, and the content described in the Japanese application is incorporated herein in its entirety.

BACKGROUND ART

Demand for high-density cables, in which the packing densities of optical fibers are enhanced, is increasing in uses for data centers in recent years. An optical fiber commonly comprises a coating resin layer for protecting a glass fiber that is an optical transmission medium. For example, the coating resin layer comprises two layers that are a primary resin layer in contact with the glass fiber and a secondary resin layer formed on the outer layer of the primary resin layer. When the packing density of an optical fiber increases, external force (lateral pressure) is applied to the optical fiber, and the microbending loss easily increases. It is known that the Young's modulus of the primary resin layer is reduced, and the Young's modulus of the secondary resin layer is increased for improving the microbending resistance of an optical fiber. For example, resin compositions for primary coating containing urethane (meth)acrylates that are reaction products of polyols, diisocyanates, and hydroxyl group-containing (meth)acrylates are described in Patent Literatures 1 to 5.

CITATION LIST

Patent Literature

Patent Literature 1: JP 2009-197163 A
Patent Literature 2: JP 2012-111674 A
Patent Literature 3: JP 2013-136783 A
Patent Literature 4: JP 2013-501125 A
Patent Literature 5: JP 2014-114208 A

SUMMARY OF INVENTION

A resin composition for primary coating of an optical fiber according to one embodiment of the present disclosure contains a photopolymerizable compound containing a difunctional urethane (meth)acrylate and a monofunctional urethane (meth)acrylate, and a photopolymerization initiator, the difunctional urethane (meth)acrylate is a reaction product of a diol, a diisocyanate, and a hydroxyl group-containing (meth)acrylate, and the monofunctional urethane (meth)acrylate is a reaction product of a polyoxyalkylene monoalkyl ether, a diisocyanate, and a hydroxyl group-containing (meth)acrylate, or a reaction product of a polyoxyalkylene monoalkyl ether and an isocyanate group-containing (meth)acrylate.

DESCRIPTION OF EMBODIMENTS

Figure 1:
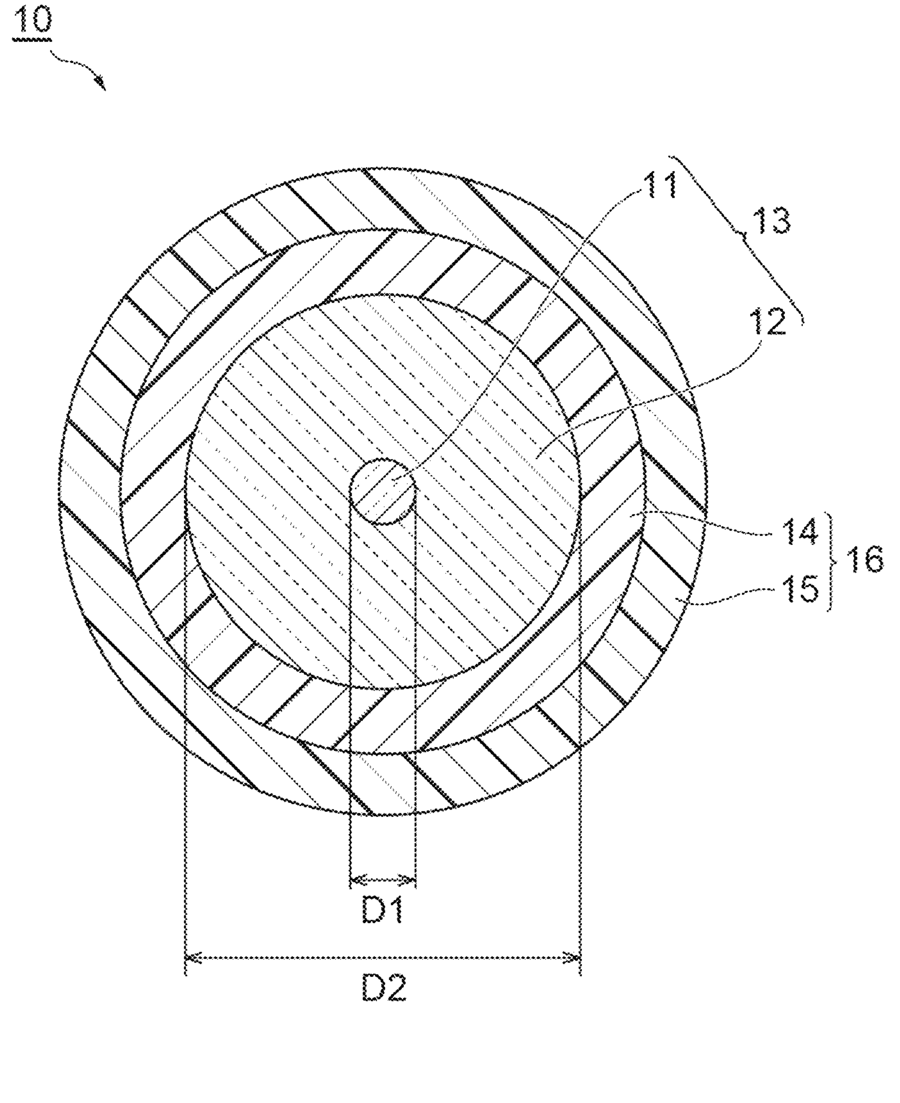
FIG. 1 is a schematic sectional view showing one example of an optical fiber according to the present embodiment.

Problem to be Solved by the Present Disclosure

As the Young's modulus of a resin composition for primary coating is reduced, the breaking strength also tends to decrease, and the production of defects (voids) in the primary resin layer easily increase the transmission loss especially at low temperature.

An object of the present disclosure is to provide a resin composition that can form a resin layer suitable for primary coating of an optical fiber having both a low Young's modulus and high breaking strength and an optical fiber that is excellent in microbending resistance and the low temperature characteristic.

Effects of the Present Disclosure

According to the present disclosure, a resin composition that can form a resin layer suitable for primary coating of an optical fiber having both a low Young's modulus and high breaking strength and an optical fiber that is excellent in microbending resistance and the low temperature characteristic can be provided.

DESCRIPTION OF EMBODIMENTS OF THE PRESENT DISCLOSURE

The contents of the embodiment of the present disclosure will be first enumerated and described. A resin composition for primary coating of an optical fiber according to one embodiment of the present disclosure contains a photopolymerizable compound containing a difunctional urethane (meth)acrylate and a monofunctional urethane (meth)acrylate, and a photopolymerization initiator, the difunctional urethane (meth)acrylate is a reaction product of a diol, a diisocyanate, and a hydroxyl group-containing (meth)acrylate, and the monofunctional urethane (meth)acrylate is a reaction product of a polyoxyalkylene monoalkyl ether, a diisocyanate, and a hydroxyl group-containing (meth)acrylate, or a reaction product of a polyoxyalkylene monoalkyl ether and an isocyanate group-containing (meth)acrylate.

Such a resin composition can have both a low Young's modulus and high breaking strength, and since defects are not produced in a primary resin layer, the resin composition can form a resin layer suitable for primary coating of an optical fiber, and can improve the microbending resistance and the low temperature characteristic of the optical fiber.

Since the Young's modulus is adjusted to a Young's modulus suitable for a primary resin layer, the number average molecular weight of the diol may be 2500 or more and 20000 or less.

Since the breaking strength of the primary resin layer is further enhanced, the number average molecular weight of the diol may be 6000 or more and 20000 or less.

Since the Young's modulus of the primary resin composition is easily adjusted, the diol may be polypropylene glycol.

Since the primary resin layer is further reduced, the number average molecular weight of the polyoxyalkylene monoalkyl ether may be 2000 or more and 10000 or less.

Since the compatibility with other components is enhanced, the polyoxyalkylene monoalkyl ether may be polyoxypropylene monobutyl ether.

Since the Young's modulus is adjusted to a Young's modulus suitable for the primary resin layer, the content of the monofunctional urethane (meth)acrylate may be 10 parts by mass or more and 70 parts by mass or less based on 100 parts by mass of the total amount of the resin composition.

The photopolymerizable compound may further comprise an N-vinyl compound to improve the curing rate of the resin composition.

A method for producing a resin composition according to one embodiment of the present disclosure comprises a step of reacting a diol, a diisocyanate, and a hydroxyl group-containing (meth)acrylate to synthesize a difunctional urethane (meth)acrylate; a step of reacting a polyoxyalkylene monoalkyl ether, a diisocyanate, and a hydroxyl group-containing (meth)acrylate or reacting a polyoxyalkylene monoalkyl ether and an isocyanate group-containing (meth) acrylate to synthesize a monofunctional urethane (meth) acrylate; and a step of mixing a photopolymerizable compound comprising the difunctional urethane (meth)acrylate and the monofunctional urethane (meth)acrylate with a photopolymerization initiator to prepare a resin composition. A resin composition that can have both a low Young's modulus and high breaking strength, and is suitable for primary coating of the optical fiber can be produced thereby.

The optical fiber according to one aspect of the present disclosure comprises: a glass fiber including a core and a cladding; a primary resin layer coating the glass fiber in contact with the glass fiber; and a secondary resin layer coating the primary resin layer, and the primary resin layer contains a cured material of the above-mentioned resin composition. Such an optical fiber is excellent in microbending resistance and the low temperature characteristic without causing the defects of the primary resin layer.

A method for producing the optical fiber according to one aspect of the present disclosure comprises: an application step of applying the above-mentioned resin composition to the periphery of the glass fiber including the core and the cladding, and a curing step of curing the resin composition by irradiation with ultraviolet rays after the application step. The optical fiber that is excellent in microbending resistance and the low temperature characteristic can be produced thereby.

In an optical fiber ribbon according to one aspect of the present disclosure, a plurality of the above-mentioned optical fibers are arranged in parallel and coated with a resin for a ribbon. Such an optical fiber ribbon is excellent in microbending resistance and the low temperature characteristic, and can be highly densely packed in an optical fiber cable.

With respect to an optical fiber cable according to one aspect of the present disclosure, the above-mentioned optical fiber ribbon is accommodated in the cable. The optical fiber cable according to the present disclosure may be an aspect in which a plurality of the above-mentioned optical fibers are accommodated in the cable. The optical fiber cable comprising the optical fiber or the optical fiber ribbon according to the present embodiment is excellent in microbending resistance and the low temperature characteristic.

DETAILS OF THE EMBODIMENTS OF THE PRESENT DISCLOSURE

Specific examples of the resin composition and the optical fiber according to the present embodiment will be described with reference to a drawing if needed. The present disclosure is not limited to this exemplification, is shown by the claims, and is intended to include all modifications in meanings and a scope equivalent to the claims. In the following descriptions, the same components are indicated with the same reference numeral, and the same descriptions are omitted in the description of the drawing. A (meth)acrylate used herein means an acrylate or a methacrylate corresponding thereto. Other similar expressions such as (meth)acryloyl are in the same way.

(Resin Composition)

The resin composition according to the present embodiment contains a photopolymerizable compound containing a difunctional urethane (meth)acrylate and a monofunctional urethane (meth)acrylate, and a photopolymerization initiator.

The difunctional urethane (meth)acrylate according to the present embodiment is a reaction product of a diol, a diisocyanate, and a hydroxyl group-containing (meth)acrylate. The difunctional urethane (meth)acrylate is a component having two (meth)acryloyl groups. Hereinafter, the urethane (meth)acrylate containing the difunctional urethane (meth)acrylate as the main ingredient may be referred to as a "urethane (meth)acrylate (A)".

The difunctional urethane (meth)acrylate can be represented by the following formula (1). In formula (1), A represents a residue of the hydroxyl group-containing (meth) acrylate, U represents a urethane bond, I represents a residue of the diisocyanate, P2 represents a residue of the diol, and n is an integer of 1 or more.

$$A\text{-}(U\text{-}I\text{-}U\text{-}P2)n\text{-}U\text{-}I\text{-}U\text{-}A \quad (1)$$

Examples of the diol include polyether diols, polyester diols, polycaprolactone diols, polycarbonate diols, polybutadiene diols, and bisphenol A-ethylene oxide adduct diol. Examples of the polyether diols include polytetramethylene glycol (PTMG), polyethylene glycol (PEG), polypropylene glycol (PPG), a block copolymer of PTMG-PPG-PTMG, a block copolymer of PEG-PPG-PEG, a random copolymer of PTMG-PEG, and a random copolymer of PTMG-PPG. Since the Young's modulus and the breaking strength of the resin layer are easily adjusted, it is preferable to use polypropylene glycol as the diol.

The number average molecular weight (Mn) of the diol may be 2500 or more and 20000 or less, 4000 or more and 20000 or less, or 5000 or more and 20000 or less from the viewpoint of obtaining a Young's modulus suitable for the primary resin layer. The Mn of the diol may be 6000 or more and 20000 or less, 8000 or more and 19000 or less, or 10000 or more and 18500 or less from the viewpoint of further enhancing the breaking strength of the primary resin layer.

Examples of the diisocyanate include 2,4-tolylene diisocyanate, 2,6-tolylene diisocyanate, isophorone diisocyanate, dicyclohexylmethane diisocyanate, diphenylmethane diisocyanate, hexamethylene diisocyanate, xylylene diisocyanate, hydrogenated xylylene diisocyanate, 1,5-naphthalene diisocyanate, norbornene diisocyanate, 1,5-pentamethylene diisocyanate, tetramethylxylylene diisocyanate, and trimethylhexamethylene diisocyanate.

Examples of the hydroxyl group-containing (meth)acrylate include 2-hydroxyethyl (meth)acrylate, 2-hydroxypropyl (meth)acrylate, 2-hydroxybutyl (meth)acrylate, caprolactone (meth)acrylate, 2-hydroxy-3-phenoxypropyl (meth) acrylate, 2-(meth)acryloyloxyethyl-2-hydroxyethyl phthalic acid, 2-hydroxy-O-phenylphenolpropyl (meth)acrylate, 2-hydroxy-3-methacrylpropyl acrylate, trimethylolpropane di(meth)acrylate, and pentaerythritol tri(meth)acrylate. From the viewpoint of the reactivity, 2-hydroxyethyl acrylate is preferable.

The urethane (meth)acrylate (A) may further contain a reaction product of the diol, the diisocyanate, the hydroxyl group-containing (meth)acrylate, and an active hydrogen-containing silane compound. The rate of (meth)acryloyl groups, which are photopolymerizable groups, can be reduced, the Young's modulus of the primary resin layer can be reduced, and the adhesion to the glass fiber can be improved by introducing groups based on the active hydrogen-containing silane compound into the urethane (meth) acrylate.

Examples of the active hydrogen-containing silane compound include N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, 3-mercaptopropylmethyldimethoxysilane, and 3-mercaptopropyltrimethoxysilane.

The urethane (meth)acrylate (A) may further contain a reaction product of the diol, the diisocyanate, the hydroxyl group-containing (meth)acrylate, and a monohydric alcohol from the viewpoint of adjusting the Young's modulus of the primary resin layer.

Examples of the monohydric alcohol include methanol, ethanol, 1-propanol, 2-propanol, 1-butanol, 2-butanol, 2-methyl-2-propanol, 1-pentanol, 2-pentanol, 3-pentanol, 2-methyl-1-butanol, 3-methyl-1-butanol, 2-methyl-2-butanol, and 3-methyl-2-butanol.

Examples of the method for preparing the urethane (meth) acrylate (A) include a method involving reacting the diol and the diisocyanate to synthesize an isocyanate group (NCO)-terminated prepolymer and then reacting the hydroxyl group (OH)-containing (meth)acrylate therewith; a method involving reacting the diisocyanate and the hydroxyl group-containing (meth)acrylate and then reacting the diol therewith; and a method involving reacting the diol, the diisocyanate, and the hydroxyl group-containing (meth) acrylate at the same time. When the urethane (meth)acrylate (A) is prepared, the hydroxyl group-containing (meth)acrylate may be mixed with the active hydrogen-containing silane compound or the monohydric alcohol as needed and used.

It is preferable that the molar ratio of NCO to OH (NCO/OH) at the time of reacting the diol and the diisocyanate be 1.1 or more and 4.0 or less, it is more preferable that the molar ratio be 1.2 or more and 3.5 or less, and it is further preferable that the molar ratio be 1.4 or more and 3.0 or less. It is preferable that the molar ratio of the total of the OH group-containing (meth)acrylate, the active hydrogen-containing silane compound, and the monohydric alcohol to the NCO of the NCO-terminated prepolymer be 1.00 or more and 1.15 or less, and it is more preferable that the molar ratio be 1.03 or more and 1.10 or less. It is preferable that the molar ratio of the total of the active hydrogen-containing silane compound and the monohydric alcohol to the NCO of the NCO-terminated prepolymer be 0 or more and 0.5 or less.

The monofunctional urethane (meth)acrylate according to the present embodiment is a reaction product of the polyoxyalkylene monoalkyl ether, the diisocyanate, and the hydroxyl group-containing (meth)acrylate, or a reaction product of the polyoxyalkylene monoalkyl ether and the isocyanate group-containing (meth)acrylate. The monofunctional urethane (meth)acrylate is a component having one (meth)acryloyl group. Hereinafter, a urethane (meth)acrylate containing the monofunctional urethane (meth)acrylate as the main ingredient may be referred to as a "urethane (meth)acrylate (B)".

The monofunctional urethane (meth)acrylate that is a reaction product of the polyoxyalkylene monoalkyl ether, the diisocyanate, and the hydroxyl group-containing (meth) acrylate (B1) can be represented by the following formula (2). In formula (2), A represents a residue of the hydroxyl group-containing (meth)acrylate, U represents a urethane bond, I represents a residue of the diisocyanate, and P1 represents a residue of the polyoxyalkylene monoalkyl ether. The monofunctional urethane (meth)acrylate (B1) has a (meth)acryloyl group derived from the hydroxyl group-containing (meth)acrylate and an alkoxy group derived from the polyoxyalkylene monoalkyl ether.

$$\text{A-U-I-U-P1} \tag{2}$$

Examples of the method for synthesizing the monofunctional urethane (meth)acrylate (B1) include a method involving reacting the polyoxyalkylene monoalkyl ether and the diisocyanate and then reacting the hydroxyl group-containing (meth)acrylate therewith; a method involving reacting the diisocyanate and the hydroxyl group-containing (meth)acrylate and then reacting the polyoxyalkylene monoalkyl ether therewith; and a method involving reacting the polyoxyalkylene monoalkyl ether, the diisocyanate, and the hydroxyl group-containing (meth)acrylate at the same time.

The monofunctional urethane (meth)acrylate that is a reaction product of the polyoxyalkylene monoalkyl ether and the isocyanate group-containing (meth)acrylate (B2) can be represented by the following formula (3). In formula (3), AI represents a residue of the isocyanate group-containing (meth)acrylate, U represents a urethane bond, and P1 represents a residue of the polyoxyalkylene monoalkyl ether. The monofunctional urethane (meth)acrylate (B2) has a (meth)acryloyl group derived from the isocyanate group-containing (meth)acrylate and an alkoxy group derived from the polyoxyalkylene monoalkyl ether.

$$\text{AI-U-P1} \tag{3}$$

The polyoxyalkylene monoalkyl ether is a compound having oxyalkylene groups, alkoxy groups, and hydroxyl groups. Examples of the polyoxyalkylene monoalkyl ether according to the present embodiment include polyoxyethylene oleyl ether, polyoxyethylene lauryl ether, polyoxyethylene cetyl ether, polyoxyethylene stearyl ether, polyoxyethylene alkyl ($C_{12}$ to $C_{14}$) ether, polyoxyethylene tridecyl ether, polyoxyethylene myristyl ether, polyoxyethylene isostearyl ether, polyoxyethylene octyldodecyl ether, polyoxyethylene cholesteryl ether, polyoxypropylene butyl ether, polyoxypropylene myristyl ether, polyoxypropylene cetyl ether, polyoxypropylene stearyl ether, polyoxypropylene lanolin alcohol ether, polyoxyethylene polyoxypropylene butyl ether, polyoxyethylene polyoxypropylene lauryl ether, polyoxyethylene polyoxypropylene cetyl ether, polyoxyethylene polyoxypropylene stearyl ether, and polyoxyethylene polyoxypropylene decyl tetradecyl ether.

It is preferable that the polyoxyalkylene monoalkyl ether be polyoxypropylene monobutyl ether from the viewpoint of the compatibility of the primary resin composition.

It is preferable that the Mn of the polyoxyalkylene monoalkyl ether be 2000 or more and 10000 or less, the Mn may be 2100 or more or 2200 or more, or may be 8000 or less or 7000 or less from the viewpoint of obtaining a Young's modulus suitable for the primary resin layer.

The hydroxyl values are measured based on JIS K 0070, and the Mn of the diol and the Mn of the polyoxyalkylene monoalkyl ether can be calculated from the following expression. The number of the functional groups of the diol is 2, the number of the functional group of the polyoxyalkylene monoalkyl ether is 1.

Mn=56.1×the number of functional group×1000/hydroxyl value

Since the breaking strength of the primary resin layer is easily improved, the polyoxyalkylene monoalkyl ether may contain a high molecular weight component having a molecular weight of 50000 or more, and may have asymmetric molecular weight distribution having a tail on the high molecular weight side. Examples of such a polyoxyalkylene monoalkyl ether include the commercial names "ACROBUTE MB-90" and "ACROBUTE MB-52" produced by NOF CORPORATION. It can be confirmed by measurement using gel permeation chromatography (GPC) whether the high molecular weight component having a molecular weight of 50000 or more is present or not. The molecular weight of the high molecular weight component may be 100000 or more and 1000000 or less.

Examples of the isocyanate group-containing (meth)acrylate include 2-acryloyloxyethyl isocyanate, 2-methacryloyloxyethyl isocyanate, 2-(2-isocyanate ethoxy)ethyl methacrylate, 1,1-(bis-acryloyloxymethyl)ethyl isocyanate, and 1,1-(bis-methacryloyloxymethyl)ethyl isocyanate. Then, 2-acryloyloxyethyl isocyanate is preferable from the viewpoint of the reactivity.

As a catalyst when the urethane (meth)acrylate is synthesized, an organotin compound or an amine compound is used. Examples of the organotin compound include dibutyltin dilaurate, dibutyltin diacetate, dibutyltin malate, dibutyltin bis(2-ethylhexyl mercaptoacetate), dibutyltin bis(isooctyl mercaptoacetate), and dibutyltin oxide. It is preferable to use dibutyltin dilaurate or dibutyltin diacetate from the viewpoints of availability or catalyst performance as the catalyst.

The Mn of the urethane (meth)acrylate (A) may be 6000 or more and 50000 or less, 8000 or more and 45000 or less, or 10000 or more and 40000 or less from the viewpoint of obtaining a Young's modulus suitable for the primary resin layer. The Mn of the urethane (meth)acrylate (B) is 4000 or more and 20000 or less, 5000 or more and 18000 or less, or 6000 or more and 15000 or less. The Mn of urethane (meth)acrylate can be measured by GPC.

It is preferable that the content of the urethane (meth) acrylate (A) be 10 parts by mass or more and 70 parts by mass or less, it is more preferable that the content be 15 parts by mass or more and 65 parts by mass or less, and it is further preferable that the content be 20 parts by mass or more and 60 parts by mass or less based on 100 parts by mass of the total amount of the resin composition from the viewpoint of adjusting the Young's modulus of the primary resin layer.

It is preferable that the content of the urethane (meth) acrylate (B) be 10 parts by mass or more and 70 parts by mass or less, it is more preferable that the content be 15 parts by mass or more and 65 parts by mass or less, and it is further preferable that the content be 20 parts by mass or more and 60 parts by mass or less based on 100 parts by mass of the total amount of the resin composition from the viewpoint of adjusting the balance between the Young's modulus and the breaking strength of the primary resin layer.

The total content of the urethane (meth)acrylate (A) and the urethane (meth)acrylate (B) may be 50 parts by mass or more and 90 parts by mass or less, 60 parts by mass or more and 90 parts by mass or less, or 65 parts by mass or more and 85 parts by mass or less based on the total amount of the resin composition.

The photopolymerizable compound according to the present embodiment may further contain a photopolymerizable compound not having a urethane bond (hereinafter referred to as a "monomer"). Examples of the monomer include (meth)acrylic acid esters, N-vinyl compounds, and (meth) acrylamide compounds. The monomer may be a monofunctional monomer having one photopolymerizable ethylenic unsaturated group or a polyfunctional monomer having two or more ethylenic unsaturated groups. The monomer may be used as a mixture of two or more.

Examples of the monofunctional (meth)acrylic acid ester include methyl (meth)acrylate, ethyl (meth)acrylate, propyl (meth)acrylate, n-butyl (meth)acrylate, s-butyl (meth)acrylate, t-butyl (meth)acrylate, isobutyl (meth)acrylate, n-pentyl (meth)acrylate, isopentyl (meth)acrylate, hexyl (meth) acrylate, heptyl (meth)acrylate, isoamyl (meth)acrylate, 2-ethylhexy (meth)acrylate, n-octyl (meth)acrylate, isooctyl (meth)acrylate, isodecyl (meth)acrylate, lauryl (meth)acrylate, phenoxyethyl (meth)acrylate, tetrahydrofurfuryl (meth) acrylate, benzyl (meth)acrylate, cyclic trimethylolpropane formal acrylate, dicyclopentenyl (meth)acrylate, dicyclopentenyloxyethyl (meth)acrylate, dicyclopentanyl (meth) acrylate, nonylphenol polyethylene glycol (meth)acrylate, nonylphenoxy polyethylene glycol (meth)acrylate, isobornyl (meth)acrylate, 3-phenoxybenzyl (meth)acrylate, methylphenoxyethyl (meth)acrylate, phenoxy diethylene glycol (meth)acrylate, phenoxy polyethylene glycol (meth)acrylate, m-phenoxybenzyl (meth)acrylate, 2-(2-ethoxyethoxy) ethyl (meth)acrylate, 2-hydroxy-3-phenoxypropyl acrylate, carboxyethyl (meth)acrylate, carboxypentyl (meth)acrylate, and ω-carboxy-polycaprolactone (meth)acrylate.

Examples of the polyfunctional (meth)acrylic acid ester include difunctional monomers such as ethylene glycol di(meth)acrylate, polyethylene glycol di(meth)acrylate, polypropylene glycol di(meth)acrylate, neopentyl glycol di(meth)acrylate, tripropylene glycol di(meth)acrylate, triethylene glycol di(meth)acrylate, cyclohexanedimethanol di(meth)acrylate, dipropylene glycol di(meth)acrylate, tetraethylene glycol di(meth)acrylate, hydroxypivalate neopentyl glycol di(meth)acrylate, 1,3-butylene glycol di(meth) acrylate, 1,4-butanediol di(meth)acrylate, diethylene glycol di(meth)acrylate, 1,6-hexanediol di(meth)acrylate, 1,9-nonanediol di(meth)acrylate, 1,12-dodecanediol di(meth) acrylate, 1,14-tetradecanediol di(meth)acrylate, 1,16-haxadecanediol di(meth)acrylate, 1,20-eicosanediol di(meth) acrylate, isopentyldiol di(meth)acrylate, 3-ethyl-1,8-octanediol di(meth)acrylate, tricyclodecanol di(meth) acrylate, 9,9-bis[4-(2-hydroxyethoxy)phenyl]fluorene di(meth)acrylate, bispenol A epoxy di(meth)acrylate, bisphenol F epoxy di(meth)acrylate, an EO adduct of bispenol A di(meth)acrylate, an EO adduct of bisphenol F di(meth) acrylate, a PO adduct of bispenol A di(meth)acrylate, and a PO adduct of bisphenol F di(meth)acrylate; and tri- or more functional monomers such as trimethylolpropane tri(meth) acrylate, trimethyloloctane tri(meth)acrylate, trimethylolpropane polyethoxy tri(meth)acrylate, trimethylolpropane polypropoxy tri(meth)acrylate, trimethylolpropane polyethoxy polypropoxy tri(meth)acrylate, tris[(meth)acryloyloxyethyl] isocyanurate, pentaerythritol tri(meth)acrylate, pentaerythritol polyethoxy tetra(meth)acrylate, pentaerythritol polypropoxy tetra(meth)acrylate, pentaerythritol tetra (meth)acrylate, ditrimethylolpropane tetra(meth)acrylate, dipentaerythritol tetra(meth)acrylate, dipentaerythritol penta (meth)acrylate, dipentaerythritol hexa(meth)acrylate, and caprolactone-modified tris[(meth)acryloyloxyethyl] isocyanurate.

When the photopolymerizable compound contains a (meth)acrylic acid ester, the Young's modulus of the resin layer can be adjusted. The content of the (meth)acrylate may be 1 part by mass or more and 50 parts by mass or less, 3 parts by mass or more and 45 parts by mass or less, or 5 parts by mass or more and 40 parts by mass or less based on 100 parts by mass of the total amount of the resin composition.

Examples of the N-vinyl compounds include N-vinylpyrrolidone, N-vinyl caprolactam, N-vinyl methyl oxazolidinone, N-vinylimidazole, and N-vinyl-N-methylacetamide.

When the photopolymerizable compound contains an N-vinyl compound, the curing rate of the resin composition can be further improved. The content of the N-vinyl compound may be 1 part by mass or more and 30 parts by mass or less, 2 parts by mass or more and 20 parts by mass or less, or 5 parts by mass or more and 15 parts by mass or less based on 100 parts by mass of the total amount of the resin composition.

Examples of the (meth)acrylamide compound include dimethyl (meth)acrylamide, diethyl (meth)acrylamide, (meth)acryloyl morpholine, hydroxymethyl (meth)acrylamide, hydroxyethyl (meth)acrylamide, isopropyl (meth)acrylamide, dimethylaminopropyl (meth)acrylamide, dimethylaminopropyl acrylamide methyl chloride salt, diacetone acrylamide, (meth)acryloyl piperidine, (meth)acryloyl pyrrolidine, (meth)acrylamide, N-hexyl (meth)acrylamide, N-methyl (meth)acrylamide, N-butyl (meth)acrylamide, N-methylol (meth)acrylamide, and N-methylolpropane (meth)acrylamide.

When the photopolymerizable compound contains a (meth)acrylamide compound, the curing rate of the resin composition can be further improved. The content of the (meth)acrylamide compound may be 1 part by mass or more and 30 parts by mass or less, 2 parts by mass or more and 20 parts by mass or less, or 3 parts by mass or more and 15 parts by mass or less based on 100 parts by mass of the total amount of the resin composition.

The photopolymerization initiator can be suitably selected from well-known radical photopolymerization initiators and used. Examples of the photopolymerization initiator include 1-hydroxycyclohexyl phenyl ketone (Omnirad 184, produced by IGM Resins B.V.), 2,2-dimethoxy-2-phenyl acetophenone (Omnirad 651, produced by IGM Resins B.V.), 2,4,6-trimethylbenzoyl diphenylphosphine oxide (Omnirad TPO, produced by IGM Resins B.V.), ethyl(2,4,6-trimethylbenzoyl)-phenyl phosphinate (Omnirad TPO-L, produced by IGM Resins B.V.), 2-benzyl-2-dimethylamino-4'-morpholinobutyrophenone (Omnirad 369, produced by IGM Resins B.V.), 2-dimethylamino-2-(4-methylbenzyl)-1-(4-morpholin-4-yl-phenyl)-butan-1-one (Omnirad 379, produced by IGM Resins B.V.), bis(2,4,6-trimethylbenzoyl) phenylphosphine oxide (Omnirad 819, produced by IGM Resins B.V.), and 2-methyl-1-[4-(methylthio)phenyl]-2-morpholinopropan-1-one (Omnirad 907, produced by IGM Resins B.V.).

The photopolymerization initiator may be used as a mixture of two or more. It is preferable due to excellent rapid curability of the resin composition that the photopolymerization initiator contain 2,4,6-trimethylbenzoyldiphenylphosphine oxide.

It is preferable that the content of the photopolymerization initiator be 0.2 parts by mass or more and 5 parts by mass or less, it is more preferable that the content be 0.3 parts by mass or more and 4 parts by mass or less, and it is further preferable that the content be 0.4 parts by mass or more and 3 parts by mass or less based on the total amount of the resin composition.

Since the resin composition according to the present embodiment can have both a low Young's modulus and high breaking strength, and defects in the primary resin layer are not produced, a resin layer suitable for primary coating of the optical fiber can be formed.

The resin composition according to the present embodiment can be produced by a step of reacting a diol, a diisocyanate, and a hydroxyl group-containing (meth)acrylate to synthesize a difunctional urethane (meth)acrylate; a step of reacting a polyoxyalkylene monoalkyl ether, a diisocyanate, and a hydroxyl group-containing (meth)acrylate or reacting a polyoxyalkylene monoalkyl ether and an isocyanate group-containing (meth)acrylate to synthesize a monofunctional urethane (meth)acrylate; and a step of mixing a photopolymerizable compound comprising the difunctional urethane (meth)acrylate and the monofunctional urethane (meth)acrylate with a photopolymerization initiator to prepare a resin composition.

The resin composition according to the present embodiment may further contain a photoacid generator, a silane coupling agent, a leveling agent, an anti-foaming agent, an antioxidant, an ultraviolet absorber, and the like.

An onium salt having a structure of $A^+B^-$ may be used as the photoacid generator. Examples of the photoacid generator include sulfonium salts such as CPI-100P, 101A, 110P, 200K, 210S, 310B, and 410S (produced by San-Apro Ltd.) and Omnicat 270 and 290 (produced by IGM Resins B.V.); and iodonium salts such as CPI-IK-1 (produced by San-Apro Ltd.), Omnicat 250 (produced by IGM Resins B.V.), WPI-113, 116, 124, 169, and 170 (produced by FUJIFILM Wako Pure Chemical Corporation).

Examples of the silane coupling agents include tetramethyl silicate, tetraethyl silicate, mercaptopropyltrimethoxysilane, vinyl trichlorosilane, vinyltriethoxysilane, vinyl tris (β-methoxy-ethoxy)silane, β-(3,4-epoxycyclohexyl)-ethyltrimethoxysilane, dimethoxydimethylsilane, diethoxydimethylsilane, 3-(meth)acryloxypropyltrimethoxysilane, γ-glycidoxypropyltrimethoxysilane, γ-glycidoxypropylmethyldiethoxysilane, γ-methacryloxypropyltrimethoxysilane, N-(β-aminoethyl)-γ-aminopropyltrimethoxysilane, N-(β-aminoethyl)-γ-aminopropyltrimethyldimethoxysilane, N-phenyl-γ-aminopropyltrimethoxysilane, γ-chloropropyltrimethoxysilane, γ-mercaptopropyltrimethoxysilane, γ-aminopropyltrimethoxysilane, bis-[3-(triethoxysilyl)propyl]tetrasulfide, bis-[3-(triethoxysilyl) propyl]disulfide, γ-trimethoxysilylpropyldimethylthiocarbamyl tetrasulfide, and γ-trimethoxysilylpropylbenzothiazyl tetrasulfide.

It is preferable that the viscosity at 25° C. of the resin composition according to the present embodiment be 0.5 Pa·s or more and 20 Pa·s or less, it is more preferable that the viscosity be 0.8 Pa·s or more and 18 Pa·s or less, and it is further preferable that the viscosity be 1 Pa·s or more and 15 Pa·s or less from the viewpoint of the coatability. The viscosity at 25° C. of the resin composition can be measured under the conditions of spindle: No. 18 and the number of revolutions: 10 rpm using a Brookfield type viscometer ("digital viscometer DV-II" manufactured by AMETEK-.Inc.).

(Optical Fiber)

FIG. 1 is a schematic sectional view showing one example of the optical fiber according to the present embodiment. An optical fiber 10 comprises a glass fiber 13 including a core 11 and a cladding 12 and a coating resin layer 16 including a primary resin layer 14 and a secondary resin layer 15 provided on the periphery of the glass fiber 13.

The cladding 12 surrounds the core 11. The core 11 and the cladding 12 mainly contain glass such as silica glass, and for example, germanium-added silica glass or pure silica glass can be used for the core 11, and pure silica glass or fluorine-added silica glass can be used for the cladding 12.

In FIG. 1, for example, the outer diameter of the glass fiber 13 (D2) is around 100 μm to 125 μm, and the diameter of the core 11 (D1), constituting the glass fiber 13, is around 7 μm to 15 μm. The thickness of the coating resin layer 16 is usually around 22 μm to 70 μm. The thickness of each layer of the primary resin layer 14 and the secondary resin layer 15 may be around 5 μm to 50 μm.

When the outer diameter of the glass fiber 13 is around 125 μm, and the thickness of the coating resin layer 16 is 60 μm or more and 70 μm or less, the thickness of each layer of the primary resin layer 14 and the secondary resin layer 15 may be around 10 μm to 50 μm, and, for example, the thickness of the primary resin layer 14 may be 35 μm, and the thickness of secondary resin layer 15 may be 25 μm. The outer diameter of the optical fiber 10 may be around 245 μm to 265 μm.

When the outer diameter of the glass fiber 13 is around 125 μm, and the thickness of the coating resin layer 16 is 20 μm or more and 48 μm or less, the thickness of each layer of the primary resin layer 14 and the secondary resin layer 15 may be around 8 μm to 38 μm, and, for example, the thickness of the primary resin layer 14 may be 25 μm, and the thickness of the secondary resin layer 15 may be 10 μm. The outer diameter of the optical fiber 10 may be around 165 μm to 221 μm.

When the outer diameter of the glass fiber 13 is around 100 μm, and the thickness of the coating resin layer 16 is 22 μm or more and 37 μm or less, the thickness of each layer of the primary resin layer 14 and the secondary resin layer 15 may be around 5 μm to 32 μm, and, for example, the thickness of the primary resin layer 14 may be 25 μm, and the thickness of the secondary resin layer 15 may be 10 μm. The outer diameter of the optical fiber 10 may be around 144 μm to 174 μm.

The application of the resin composition according to the present embodiment to the primary resin layer enables thinning the outer diameter of the optical fiber down to 220 μm or less and producing an optical fiber that is excellent in microbending resistance and the low temperature characteristic.

The method for producing the optical fiber according to the present embodiment comprises: an application step of applying the above-mentioned resin composition to the periphery of the glass fiber including the core and the cladding; and a curing step of curing the resin composition by irradiation with ultraviolet rays after the application step. The formation of a resin layer using the resin composition according to the present embodiment enables producing an optical fiber that is excellent in microbending resistance and the low temperature characteristic.

It is preferable that the Young's modulus of the primary resin layer be 0.8 MPa or less, and it is more preferable that the Young's modulus be 0.5 MPa or less at 23° C.±2° C. from the viewpoint of improving the microbending resistance of the optical fiber. When the Young's modulus of the primary resin layer exceeds 0.8 MPa, external force is easily transmitted to the glass fiber, and the transmission loss increase due to microbending may increase.

The Young's modulus of the primary resin layer can be measured by the pullout modulus (POM) method at 23° C. Two places of the optical fiber are fixed with two chucking devices, the coating resin layer (the primary resin layer and the secondary resin layer) part between the two chucking devices is removed, one chucking device is subsequently fixed, and the other chucking device is slowly moved to the opposite direction to the fixed chucking device. When the length of the part held in the chucking device to be moved is defined as L, the movement of the chucking device is defined as Z, the outer diameter of the primary resin layer is defined as Dp, the outer diameter of the glass fiber is defined as Df, the Poisson's ratio of the primary resin layer is defined as n, and the load at the time of moving the chucking device in the optical fiber is defined as W, the Young's modulus of the primary resin layer can be calculated from the following expression.

$$\text{Young's modulus (MPa)}=((1+n)W/\pi LZ)\times\ln(Dp/Df)$$

The secondary resin layer 15 can be formed, for example, by curing a resin composition containing a photopolymerizable compound containing the urethane (meth)acrylate, the photopolymerization initiator, and the like. The resin composition for forming the secondary resin layer has a composition different from that of the resin composition for primary coating. The resin composition for the secondary coating can be prepared using a conventionally well-known technique.

It is preferable that the Young's modulus of the secondary resin layer at 23° C.±2° C. be 800 MPa or more, it is more preferable that the Young's modulus be 1000 MPa or more, and it is further preferable that the Young's modulus be 1200 MPa or more from the viewpoint of improving the microbending resistance of the optical fiber. Although the upper limit of the Young's modulus of the secondary resin layer is not particularly limited, the upper limit may be 3000 MPa or less, 2500 MPa or less, or 2000 MPa or less at 23° C.±2° C. from the viewpoint of imparting moderate toughness to the secondary resin layer.

The Young's modulus of the secondary resin layer can be measured by the following method. First, the optical fiber is immersed in a mixed solvent of acetone and ethanol, and only the coating resin layer is extracted in a cylindrical shape. Although the primary resin layer and the secondary resin layer are united at this time, the Young's modulus of the primary resin layer is 1/1000 or more and 1/10000 or less of the Young's modulus of the secondary resin layer, the Young's modulus of the primary resin layer is therefore negligible. Next, the solvent is removed from the coating resin layer by vacuum drying, a tensile test (the tensile speed is 1 mm/minute) can be performed at 23° C., and the Young's modulus can be calculated by a secant expression at 2.5% strain.

In the method for producing the optical fiber according to the present embodiment, the use of the resin composition according to the present embodiment as the resin composition for primary coating enables producing an optical fiber the outer diameter of which can be thinned down to 220 μm or less and that is excellent in microbending resistance and the low temperature characteristic.

(Optical Fiber Ribbon)

An optical fiber ribbon can be produced using the optical fibers according to the present embodiment. In the optical fiber ribbon, a plurality of the above-mentioned optical fibers are arranged in parallel and coated with a resin for a ribbon.

Figure 2:
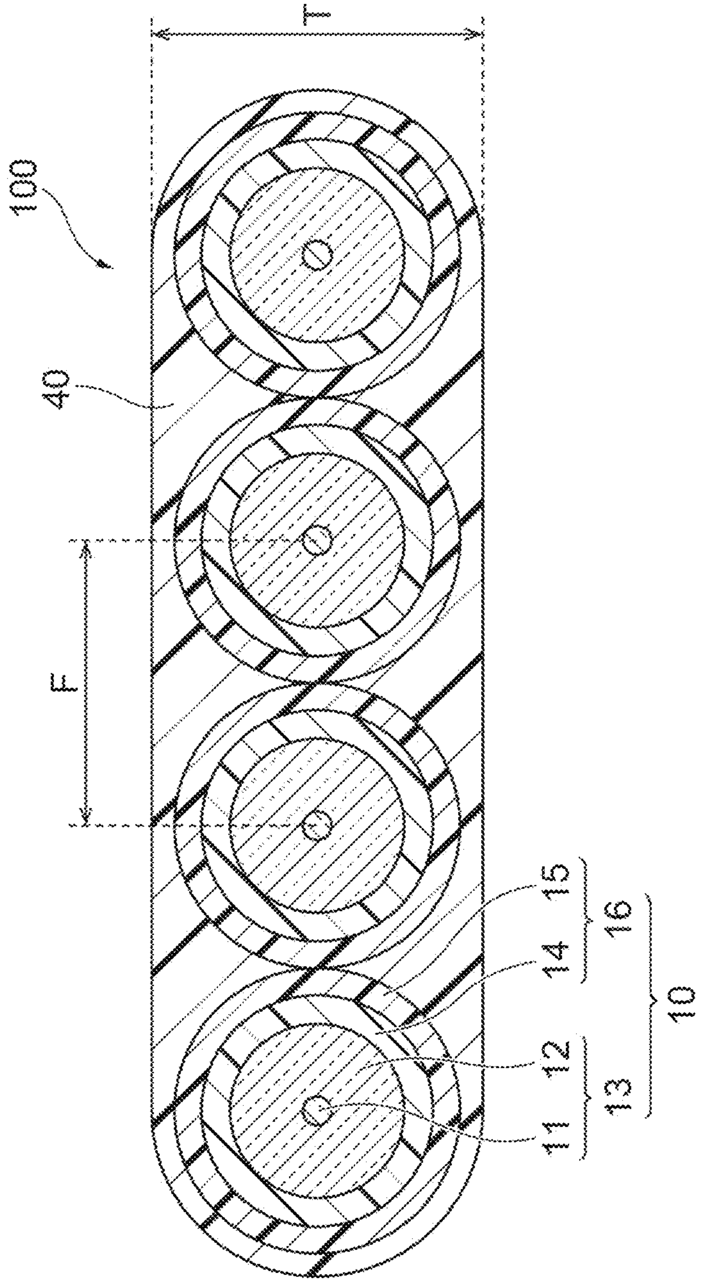
FIG. 2 is a schematic sectional view showing an optical fiber ribbon according to one embodiment.

FIG. 2 is a schematic sectional view showing the optical fiber ribbon according to one embodiment. An optical fiber ribbon 100 has a plurality of optical fibers 10 and a connective resin layer 40 through which the optical fibers 10 are (integrally) coated and connected with the resin for a ribbon. Although, in FIG. 2, four optical fibers 10 are shown as an example, the number thereof is not particularly limited.

The optical fibers 10 may be arranged in parallel in contact with each other and integrated, or some or all of the optical fibers 10 may be arranged in parallel at regular intervals and integrated. The distance between the centers of adjacent optical fibers 10 F may be 220 μm or more and 280 μm or less. When the distance between the centers is adjusted to 220 μm or more and 280 μm or less, the optical fibers are easily placed on the existing V-shaped grooves, and the optical fiber ribbon that is excellent in simultaneous fusibility can be obtained. Although the thickness of the optical fiber ribbon 100 T also depends on the outer diameter of the optical fibers 10, the thickness may be 164 μm or more and 285 μm or less.

Figure 3:
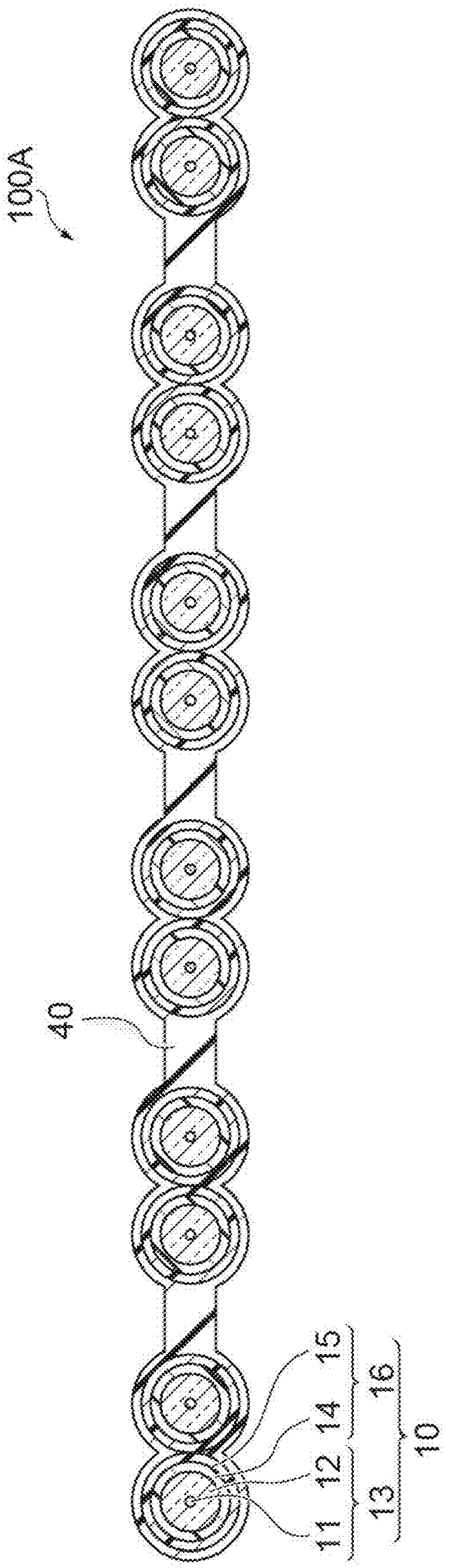
FIG. 3 is a schematic sectional view showing an optical fiber ribbon according to one embodiment.

FIG. 3 is a schematic sectional view showing one example of an optical fiber ribbon in which the optical fibers are arranged in parallel at regular intervals and integrated. In an optical fiber ribbon 100A shown in FIG. 3, pairs of optical fibers 10 are connected at regular intervals with a resin for a ribbon, thereby connecting a total of twelve optical fibers 10. The resin for a ribbon forms a connective resin layer 40.

When, as the resin for a ribbon, a resin material generally known as a ribbon material can be used. The resin for a ribbon may contain a thermosetting resin such as silicone resin, an epoxy resin, or a urethane resin or an ultraviolet-curable resin such as an epoxy acrylate, a urethane acrylate, or a polyester acrylate from the viewpoints of the damage preventing property and the ease of division of the optical fiber 10 and the like.

When the optical fibers 10 are arranged in parallel at regular intervals, namely when adjacent optical fibers 10 are united through the resin for a ribbon out of contact with each other, the thickness of the connected part at the center between the optical fibers 10 may be 150 μm or more and 220 μm or less. When the optical fiber ribbon is accommodated in a cable, the optical fiber ribbon is easily deformed, and the optical fiber ribbon may therefore have recesses in connected parts of the optical fibers. The recesses may be formed in a triangle shape having a narrow width on one surface of the connected parts.

Figure 4:
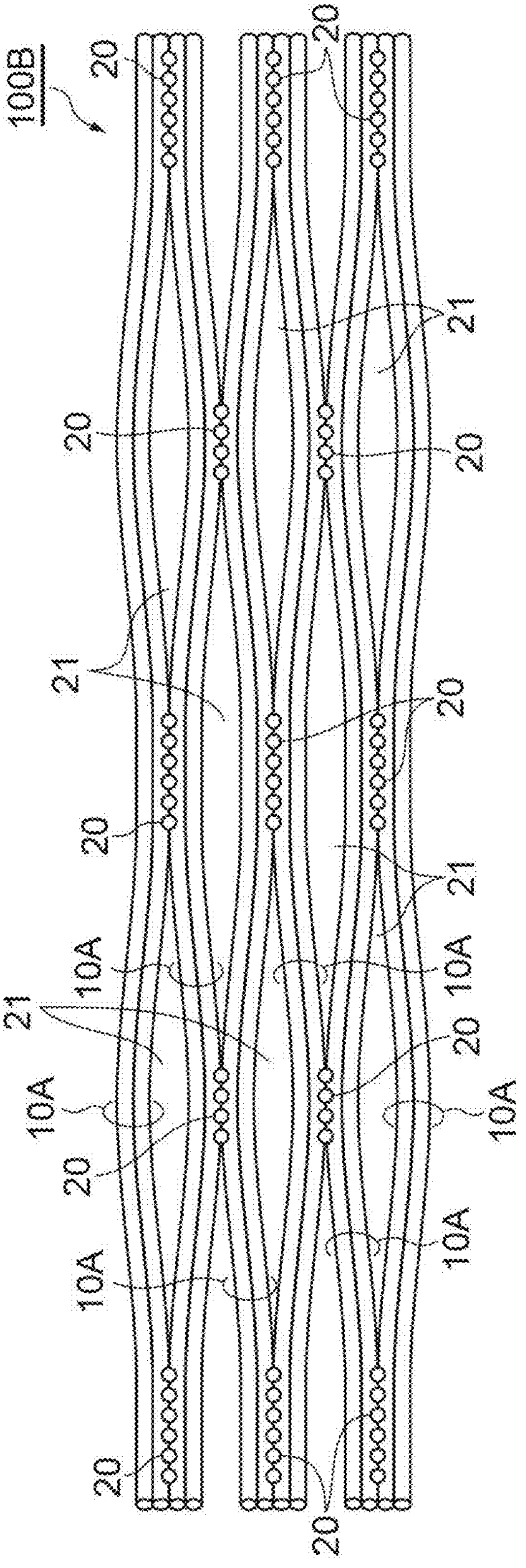
FIG. 4 is a plan view showing the appearance of an optical fiber ribbon according to one embodiment.

The optical fiber ribbon according to the present embodiment may have connected parts and unconnected parts intermittently in the longitudinal direction and the width direction. FIG. 4 is a plan view showing the appearance of the optical fiber ribbon according to one embodiment. An optical fiber ribbon 100B has a plurality of optical fibers, a plurality of connected parts 20, and a plurality of unconnected parts (divided parts) 21. The unconnected parts 21 are intermittently formed in the longitudinal direction of the optical fiber ribbon. The optical fiber ribbon 100B is an intermittent connection type optical fiber ribbon, intermittently provided with the connected parts 20 and the unconnected parts 21 in the longitudinal direction between each of the pairs of optical fibers 10A. The "connected parts" refer to parts in which adjacent optical fibers are integrated through the connective resin layer, and the "unconnected parts" refer to parts in which adjacent optical fibers are not integrated through the connective resin layer, and gaps are between the optical fibers.

Since the connected parts 20 provided between each of the pairs of cores are intermittently provided with the unconnected parts 21 in the optical fiber ribbon having the above-mentioned configuration, the optical fiber ribbon is easily deformed. When the optical fiber ribbon is installed in an optical fiber cable, the optical fiber ribbon can therefore be easily rounded and installed, the optical fiber ribbon can therefore be formed into an optical fiber ribbon suitable to be installed at high density. Since the connected parts 20 can be easily torn from the unconnected parts 21, the optical fibers 10 in the optical fiber ribbon are easily separated into single cores.

The optical fiber ribbon according to the present embodiment is excellent in microbending resistance and the low temperature characteristic, and can be packed in the optical fiber cable at high density using the above-mentioned optical fibers.

(Optical Fiber Cable)

With respect to an optical fiber cable according to the present embodiment, the above-mentioned optical fiber ribbons are accommodated in the cable. Examples of the optical fiber cable include a slot type optical fiber cable having a plurality of slots. The above-mentioned optical fiber ribbons can be installed in the slots so that the installation density in each slot is around 25% to 65%. The installation density means the ratio of the cross section of the optical fiber ribbons installed in a slot to the cross section of the slot. The optical fiber cable according to the present embodiment may be an aspect in which the above-mentioned plurality of optical fibers are accommodated in a cable without being coated with the resin for a ribbon.

Examples of the optical fiber cable according to the present embodiment will be described with reference to FIGS. 5 and 6. Although, in FIGS. 5 and 6, the intermittent connection type optical fiber ribbons are accommodated, the plurality of optical fibers not coated with the resin for a ribbon may be bundled and accommodated.

Figure 5:
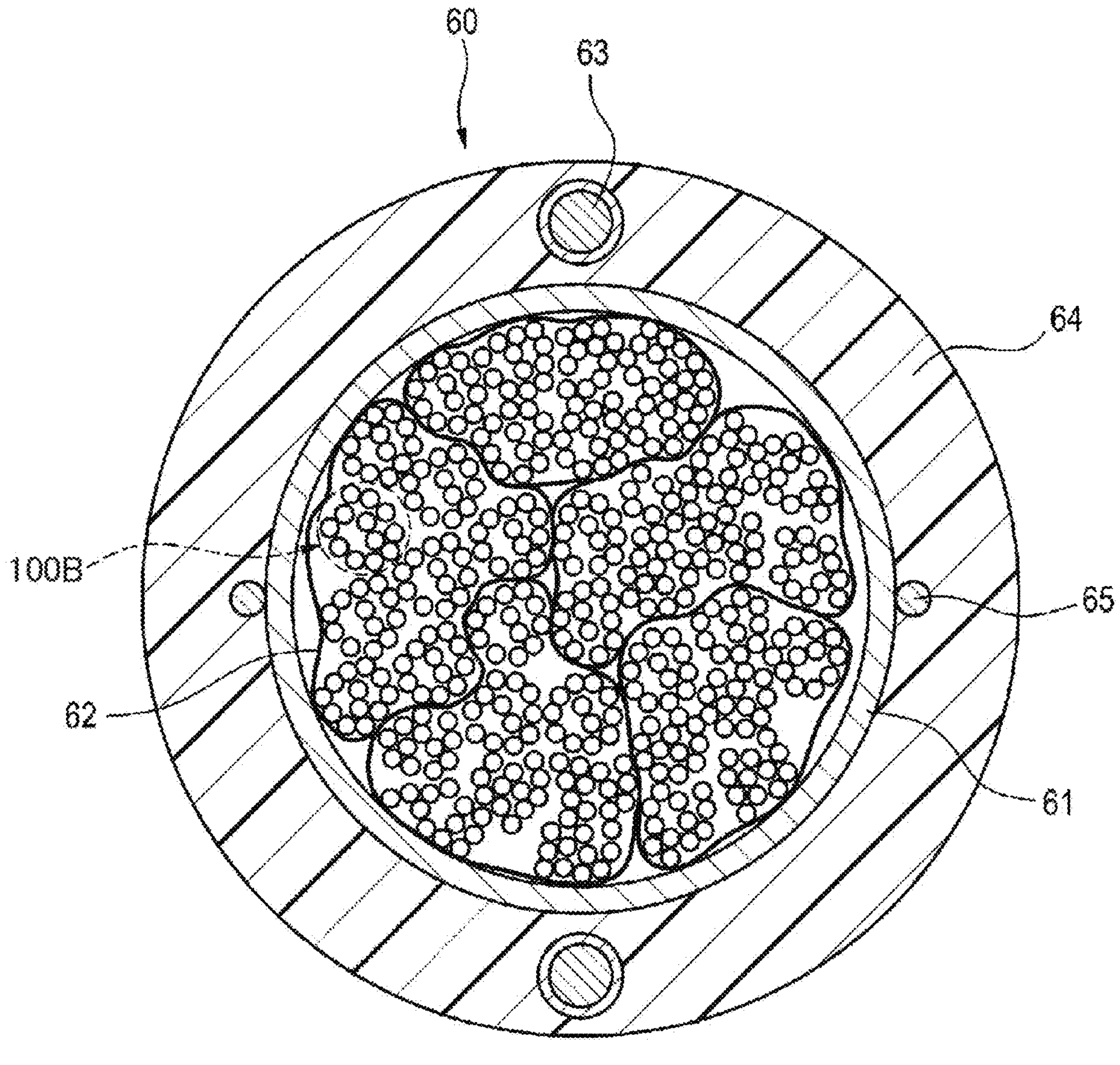
FIG. 5 is a schematic sectional view showing an optical fiber cable according to one embodiment.

FIG. 5 is a schematic sectional view of a slotless type optical fiber cable 60 using the intermittent connection type optical fiber ribbons 100B, described above. The optical fiber cable 60 has a cylindrical tube 61 and a plurality of optical fiber ribbons 100B. The plurality of optical fiber ribbons 100B may be bundled with an interposition 62 such as aramid fiber. The plurality of optical fiber ribbons 100B may have different markings, respectively. The optical fiber cables 60 is a structure formed by twisting the bundled plurality of optical fiber ribbons 100B, extruding a resin to be the tube 61 therearound, and coating the tube 61 together with tension members 63 with a jacket 64. When waterproofness is required, water-absorbing yarn may be inserted into the tube 61. For example, the tube 61 can be formed using a resin such as polybutylene terephthalate or high-density polyethylene. Tear cords 65 may be provided outside the tube 61.

Figure 6:
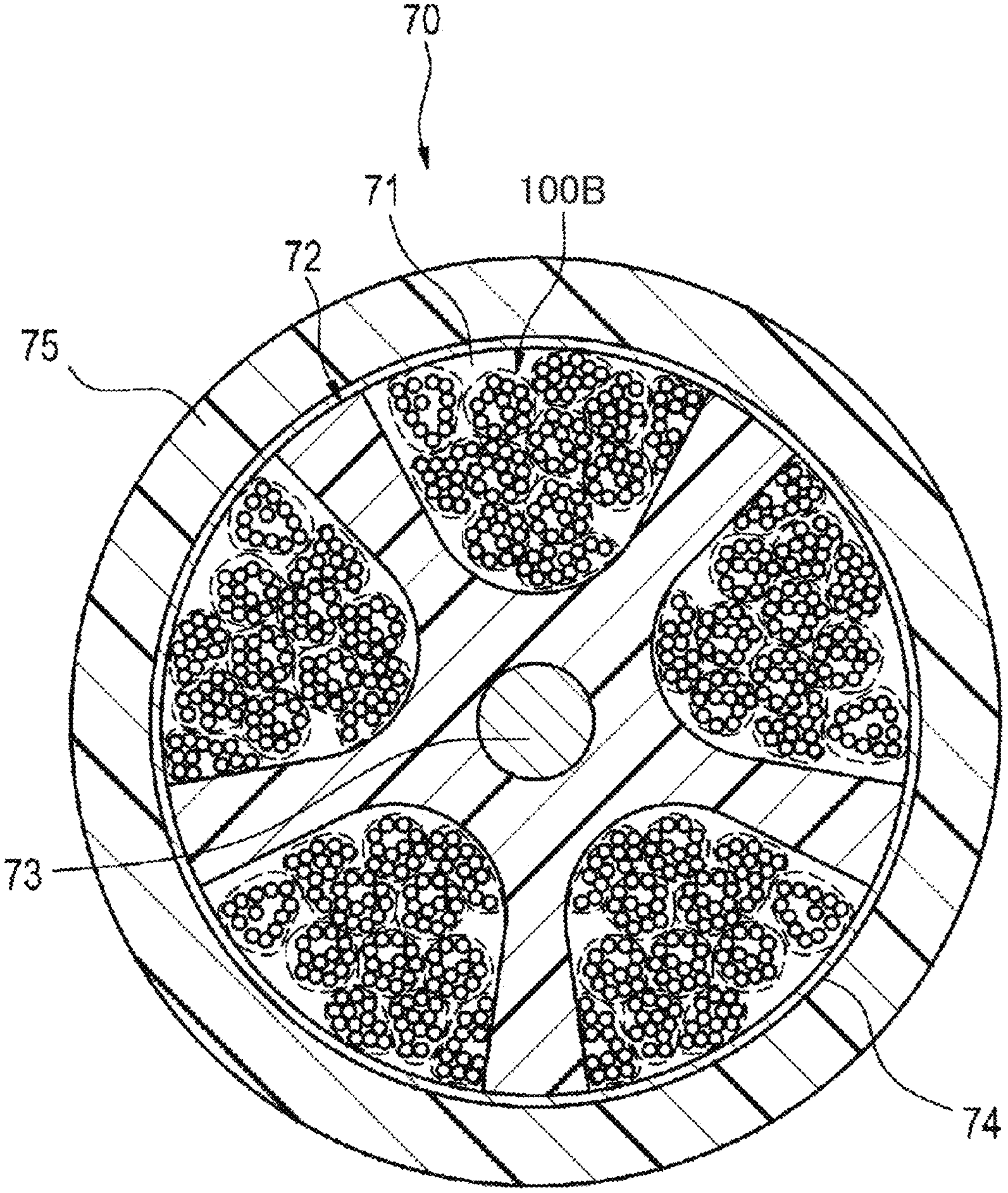
FIG. 6 is a schematic sectional view showing an optical fiber cable according to one embodiment.

FIG. 6 is a schematic sectional view of a slot type optical fiber cable 70 using the intermittent connection type optical fiber ribbons 100B, described above. The optical fiber cable 70 has a slot rod 72 having a plurality of slots 71 and a plurality of optical fiber ribbon 100B. The optical fiber cable 70 is a structure in which the slot rod 72 having a tension member 73 at the center is radially provided with the plurality of slots 71. The plurality of slots 71 may be provided in a shape twisted in a spiral form or an SZ form in a longitudinal direction of the optical fiber cable 70. A plurality of concentrated optical fiber ribbons 100B, into which the optical fiber ribbons 100B arranged in parallel are separated, are accommodated in the slots 71. The optical fiber ribbons 100B may be bundled with bundle materials for identification. A press-winding tape 74 is wound around the slot rod 72, and a jacket 75 is formed around the press-winding tape 74.

The optical fiber cables comprising the optical fibers or the optical fiber ribbons according to the present embodiment are excellent in microbending resistance and the low temperature characteristic.

EXAMPLES

Hereinafter, the results of evaluation tests using Examples and Comparative Examples according to the present disclosure will be shown, and the present disclosure will be described in further detail. The present invention is not limited to these Examples.

[Synthesis of Urethane Acrylate (A)]

A urethane acrylate containing a difunctional urethane acrylate as the main ingredient (A) was synthesized in the following procedures.

(A-1)

First, 2,4-tolylene diisocyanate (TDI) and polypropylene glycol having an Mn of 3000 ("SANNIX PP-3000" produced by Sanyo Chemical Industries, Ltd.) were reacted at 60° C. for 1 hour so that the molar ratio of NCO to OH (NCO/OH) was 1.5, and an NCO-terminated prepolymer was prepared. Subsequently, 200 ppm dibutyltin dilaurate was added based on the final total fed amount as a catalyst. Next, 2-hydroxyethyl acrylate (HEA) was added so that the molar ratio of the OH to the NCO of the NCO-terminated prepolymer was 1.05, and the mixture was reacted at 60° C. for 1 hour to obtain a urethane acrylate having an Mn of 11300 (A-1).

(A-2)

TDI and polypropylene glycol having an Mn of 12000 ("PREMINOL 54013F" produced by AGC Inc.) were reacted at 60° C. for 1 hour so that the NCO/OH was 2.0, and an NCO-terminated prepolymer was prepared. Subsequently, 200 ppm dibutyltin dilaurate was added based on the final total fed amount. Next, HEA was added so that the molar ratio of the OH of the HEA to the NCO of the NCO-terminated prepolymer was 1.05, and the mixture was reacted at 60° C. for 1 hour to obtain a urethane acrylate having an Mn of 24500 (A-2).

(A-3)

TDI and polypropylene glycol having an Mn of 18000 ("PREMINOL 54318F" produced by AGC Inc.) were reacted at 60° C. for 1 hour so that the NCO/OH was 2.0, and an NCO-terminated prepolymer was prepared. Subsequently, 200 ppm dibutyltin dilaurate was added based on the final total fed amount. Next, HEA was added so that the molar ratio of the OH of the HEA to the NCO of the NCO-terminated prepolymer was 1.05, and the mixture was reacted at 60° C. for 1 hour to obtain a urethane acrylate having an Mn of 36700 (A-3).

(A-4)

TDI and PREMINOL S4318F were reacted at 60° C. for 1 hour so that the NCO/OH was 2.0, and an NCO-terminated prepolymer was prepared. Subsequently, 200 ppm dibutyltin dilaurate was added based on the final total fed amount. Next, 3-mercaptopropyltrimethoxysilane (MPTS) was added so that the molar ratio of the SH to the NCO of the NCO-terminated prepolymer was 0.2, HEA was added so that the molar ratio of the OH to the NCO of the NCO-terminated prepolymer was 0.85, and the mixture was reacted at 60° C. for 1 hour to obtain a urethane acrylate having an Mn of 36800 (A-4).

(Y-1)

TDI and PP-3000 were reacted at 60° C. for 1 hour so that the NCO/OH was 1.5, and an NCO-terminated prepolymer was prepared. Subsequently, 200 ppm dibutyltin dilaurate was added based on the final total fed amount. Next, methanol was added so that the molar ratio of the OH to the NCO of the NCO-terminated prepolymer was 0.4, HEA was added so that the molar ratio of the OH to the NCO of the NCO-terminated prepolymer was 0.65, and the mixture was reacted at 60° C. for 1 hour to obtain a urethane acrylate having an Mn of 11200 (Y-1).

(Z-1)

Polypropylene glycol having an Mn of 600 (trade name "PP-600" produced by Sanyo Chemical Industries, Ltd.) and TDI were reacted at an NCO/OH of 2.0 to prepare an NCO-terminated prepolymer. Subsequently, 200 ppm dibutyltin dilaurate was added based on the final total fed amount. Next, HEA was added so that the molar ratio of the OH to the NCO of the NCO-terminated prepolymer was 1.05, and the mixture was reacted at 60° C. for 1 hour to obtain a urethane acrylate having an Mn of 2200 (Z-1).

[Synthesis of Urethane Acrylate (B)]

A urethane acrylate containing a monofunctional urethane acrylate as the main ingredient (B) was synthesized in the following procedures.

(B-1)

TDI and polyoxypropylene monobutyl ether having an Mn of 2300 (trade name "UNILUBE MB-370" produced by NOF CORPORATION) were reacted at 60° C. for 1 hour so that the NCO/OH was 2.0, and an NCO-terminated prepolymer was prepared. Subsequently, 200 ppm dibutyltin dilaurate was added based on the final total fed amount. Next, 2-hydroxyethyl acrylate (HEA) was added so that the molar ratio of the OH of the HEA to the NCO of the NCO-terminated prepolymer was 1.05, and the mixture was reacted at 60° C. for 1 hour to obtain a urethane acrylate having an Mn of 6200 (B-1).

(B-2)

TDI and polyoxypropylene monobutyl ether having an Mn of 3070 (trade name "NEWPOL LB3000" produced by Sanyo Chemical Industries, Ltd.) were reacted at 60° C. for 1 hour so that the NCO/OH was 2.0, and an NCO-terminated prepolymer was prepared. Subsequently, 200 ppm dibutyltin dilaurate was added based on the final total fed amount. Next, 2-hydroxyethyl acrylate (HEA) was added so that the molar ratio of the OH of the HEA to the NCO of the NCO-terminated prepolymer was 1.05, and the mixture was reacted at 60° C. for 1 hour to obtain a urethane acrylate having an Mn of 8900 (B-2).

(B-3)

First, 2,4-tolylene diisocyanate (TDI) and polyoxypropylene monobutyl ether having an Mn of 5000 (trade name "ACROBUTE MB-90" produced by NOF CORPORATION) were reacted at 60° C. for 1 hour so that the molar ratio of the NCO to the OH (NCO/OH) was 2.0, and an NCO-terminated prepolymer was prepared. Subsequently, 200 ppm dibutyltin dilaurate was added based on the final total fed amount. Next, HEA was added so that the molar ratio of the OH to the NCO of the NCO-terminated prepolymer was 1.05, and the mixture was reacted at 60° C. for 1 hour to obtain a urethane acrylate having an Mn of 10000 (B-3).

(B-4)

First, 2-acryloyloxyethyl isocyanate (trade name "Karenz AOI" produced by Resonac Holdings Corporation) and ACROBUTE MB-90 were reacted at 60° C. for 1 hour so that the NCO/OH was 1.0, and a urethane acrylate having an Mn of 8500 (B-4) was obtained. Subsequently, 200 ppm dibutyltin dilaurate was added based on the final total fed amount.

The Mn of polypropylene glycol and polyoxypropylene butyl monoether are values calculated from the hydroxyl values, and are values described in the catalogues of the products. The Mn of the urethane acrylate was measured using an ACQUITYAPC RI system manufactured by Nihon Waters K.K. under the conditions of sample concentration: 0.2% by mass THF solution, injection rate: 20 μL, sample temperature: 15° C., mobile phase: THF, XT columns for organic solvent: particle size 2.5 μm, pore size 450 Å, column inner diameter 4.6×column length 150 mm+particle size 2.5 μm, pore size 125 Å, column inner diameter 4.6×column length 150 mm+particle size 1.7 μm, pore size 45 Å, column inner diameter 4.6×column length 150 mm, column temperature: 40° C., and flow velocity: 0.8 mL/minute.

As monomers, nonylphenol polyethylene glycol acrylate (trade name "ARONIX M-113" produced by TOAGOSEI CO., LTD.), isobornyl acrylate (IBXA), N-vinyl caprolactam (NVCL), acryloylmorpholine (ACMO), bisphenol A epoxy di(meth)acrylate (trade name "Viscoat #540" produced by OSAKA ORGANIC CHEMICAL INDUSTRY LTD.), and tripropylene glycol diacrylate (TPGDA) were provided. As photopolymerization initiators, 2,4,6-trimethylbenzoyl diphenylphosphine oxide (Omnirad TPO) and 1-hydroxycyclohexyl phenyl ketone (Omnirad 184) were provided. As the silane coupling agent, 3-acryloxypropyltrimethoxysilane (APTMS) was provided.

[Resin Compositions for Primary Coating]

The photopolymerizable compounds, the photopolymerization initiator, and the silane coupling agent were mixed in blended amounts (part by mass) shown in Table 1 or Table 2 to produce resin compositions for primary coating of the Test Examples. Test Examples 1 to 9 corresponds to Examples, and Test Examples 10 to 14 corresponds to Comparative Examples.

(Viscosity)

The viscosity at 25° C. of each resin composition was measured under the conditions of spindle: No. 18 and the number of revolutions: 10 rpm using a Brookfield type viscometer ("digital viscometer DV-II" manufactured by AMETEK.Inc.).

[Resin Films]

Each resin composition was applied to a polyethylene terephthalate (PET) film using a spin coater and cured under the conditions of 10 mJ/cm$^2$ and 100 mW/cm$^2$ using an electrodeless UV lamp system (D bulb, manufactured by Heraeus) to form a resin film having a thickness of 200 μm on the PET film. A resin film was peeled from the PET film to obtain the resin film. Since the resin composition did not contain a urethane acrylate (A) in Test Example 14, a resin film was not able to be produced.

(Young's Modulus)

The resin film was punched out in a dumb-bell shape of JIS K 7127 type 5, and the punched resin film was pulled under the conditions of 23±2° C. and 50±10% RH under the conditions of a tensile speed of 1 mm/minute and a gauge length of 25 mm using a tensile tester to obtain a stress-strain curve. The Young's modulus of the resin film was calculated by dividing stress calculated with a secant expression of 2.5% strain by the cross section of the resin film.

(Breaking Strength and Breaking Elongation)

Each resin film was punched out in a dumb-bell shape of JIS K 7127 type 5, and the punched resin film was pulled under the conditions of 23±2° C. and 50±10% RH under the conditions of a tensile speed of 50 mm/minute and a gauge length of 25 mm using a tensile tester to obtain a stress-strain curve. The breaking strength of the resin film was calculated by dividing the stress at the time of the breaking by the cross section of the resin film. The breaking elongation of the resin film was calculated by dividing the displacement at the time of the breaking by the gauge length.

[Resin Composition for Secondary Coating]

First, 25 parts by mass of the urethane acrylate (Z-1), 36 parts by mass of TPGTA, 37 parts by mass of Viscoat #540, 1 part by mass of Omnirad TPO, and 1 part by mass of Omnirad 184 were mixed to obtain a resin composition for secondary coating.

[Optical Fibers]

The resin composition for primary coating and each resin composition for secondary coating were applied to the peripheral surface of the glass fiber 13 having a diameter of 125 μm. Subsequently, the resin compositions were cured by irradiation with ultraviolet rays, the coating resin layer 16 comprising the primary resin layer 14 and the secondary resin layer 15 was formed to produce the optical fiber 10. The thickness of the primary resin layer 14 was adjusted to 20 μm, and the thickness of the secondary resin layer 15 was adjusted to 15 μm to obtain an optical fiber having an outer diameter of 195 μm. Since the resin composition for primary coating did not contain the urethane acrylate (A) in Test Example 14, the optical fiber was not able to be produced.

(Microbending Resistance)

The transmission loss of light at a wavelength of 1550 nm when the optical fiber 10 was wound around a bobbin that had a diameter of 280 mm and the surface of which was covered with sandpaper in a monolayer form was measured by the OTDR (optical time domain reflectometer) method. If the difference in transmission loss of light at a wavelength of 1550 nm when the optical fiber 10 was wound around a bobbin that had a diameter of 280 mm without sandpaper in a monolayer form was less than 0.5 dB/km, the optical fiber was evaluated as "A", if the difference was 0.5 dB/km or more and 1.0 dB/km or less, the optical fiber was evaluated as "B", and if the difference exceeded 1.0 dB/km, the optical fiber was evaluated as "C".

(Low Temperature Characteristic)

An optical fiber was wound around a glass bobbin at a tension of 50 g in monolayer winding, the transmission characteristics of signal light at a wavelength of 1550 nm were measured under temperature conditions of 23° C. and −40° C. respectively, and the transmission loss was calculated at 23° C. and −40° C. If the transmission loss difference obtained by subtracting the transmission loss at 23° C. from the transmission loss at −40° C. was less than 0 dB, the optical fiber was evaluated as "A", if the transmission loss difference was 0 dB or more and 0.01 dB/km or less, the optical fiber was evaluated as "B", and if the transmission loss difference was more than 0.01 dB/km, the optical fiber was evaluated as "C".

TABLE 1

| Test Example | 1 | 2 | 3 | 4 | 5 | 6 | 7 | 8 | 9 |
|---|---|---|---|---|---|---|---|---|---|
| A-1 | 35 | — | — | — | — | — | — | — | — |
| A-2 | — | 35 | — | — | — | — | — | 20 | 50 |
| A-3 | — | — | 35 | — | 35 | 35 | 35 | — | — |
| A-4 | — | — | — | 35 | — | — | — | — | — |
| B-1 | — | — | — | — | 35 | — | — | — | — |
| B-2 | — | — | — | — | — | 35 | — | — | — |
| B-3 | 35 | 35 | 35 | 35 | — | — | — | 60 | — |
| B-4 | — | — | — | — | — | — | 35 | — | 20 |
| M-113 | 13 | 13 | 13 | 13 | 13 | 13 | 13 | 3 | 13 |
| IBXA | 5 | 5 | 5 | 5 | 5 | 5 | 5 | 5 | 5 |
| NVCL | 5 | 5 | 5 | 5 | 5 | 5 | 5 | 5 | 5 |
| ACMO | 5 | 5 | 5 | 5 | 5 | 5 | 5 | 5 | 5 |
| Omnirad TPO | 1 | 1 | 1 | 1 | 1 | 1 | 1 | 1 | 1 |
| APTMS | 1 | 1 | 1 | 1 | 1 | 1 | 1 | 1 | 1 |
| Viscosity [Pa · s] | 3.8 | 5.4 | 12.4 | 12.2 | 8.3 | 8.9 | 9.4 | 5.8 | 8.4 |
| Young's modulus [MPa] | 0.51 | 0.31 | 0.16 | 0.12 | 0.57 | 0.36 | 0.12 | 0.24 | 0.44 |
| Breaking strength [MPa] | 0.72 | 1.74 | 1.59 | 1.36 | 1.39 | 1.35 | 0.86 | 0.87 | 1.84 |
| Breaking elongation [%] | 110 | 260 | 310 | 290 | 180 | 200 | 290 | 170 | 240 |
| Microbending resistance | B | A | A | A | B | A | A | A | A |
| Low temperature characteristic | B | A | A | A | A | A | A | A | A |

TABLE 2

| Test Example | 10 | 11 | 12 | 13 | 14 |
|---|---|---|---|---|---|
| A-1 | 70 | 60 | 70 | — | — |
| Y-1 | — | — | — | 70 | — |
| B-3 | — | — | — | — | 70 |
| M-113 | 13 | 23 | 18 | 13 | 13 |
| IBXA | 5 | 5 | 5 | 5 | 5 |
| NVCL | 5 | 5 | — | 5 | 5 |
| ACMO | 5 | 5 | 5 | 5 | 5 |
| Omnirad TPO | 1 | 1 | 1 | 1 | 1 |
| APTMS | 1 | 1 | 1 | 1 | 1 |
| Viscosity [Pa · s] | 4.9 | 3.1 | 7.3 | 5.0 | 3.0 |
| Young's modulus [MPa] | 1.03 | 0.52 | 0.31 | 0.18 | — |
| Breaking strength [MPa] | 1.09 | 0.54 | 0.25 | 0.21 | — |
| Breaking elongation [%] | 110 | 90 | 80 | 110 | — |
| Microbending resistance | C | B | A | A | — |
| Low temperature characteristic | A | C | C | C | — |

REFERENCE SIGNS LIST

10: optical fiber
11: core
12: cladding
13: glass fiber
14: primary resin layer
15: secondary resin layer
16: coating resin layer
20: connected part
21: unconnected part
40: connective resin layer
60, 70: optical fiber cable
61: cylindrical tube
62: interposition
63, 73: tension member
64, 75: jacket
65: tear cord
71: slot
72: slot rod
74: press-winding tape
100, 100A, 100B: optical fiber ribbon.

The invention claimed is:

1. A resin composition for primary coating of an optical fiber, the resin composition comprising a photopolymerizable compound comprising a difunctional urethane (meth)acrylate and a monofunctional urethane (meth)acrylate, and a photopolymerization initiator, wherein the difunctional urethane (meth)acrylate is a reaction product of a diol, a diisocyanate, and a hydroxyl group-containing (meth)acrylate, and the monofunctional urethane (meth)acrylate is a reaction product of a polyoxyalkylene monoalkyl ether, a diisocyanate, and a hydroxyl group-containing (meth)acrylate, or a reaction product of a polyoxyalkylene monoalkyl ether and an isocyanate group-containing (meth)acrylate.

2. The resin composition according to claim 1, wherein a number average molecular weight of the diol is 2500 or more and 20000 or less.

3. The resin composition according to claim 1, wherein a number average molecular weight of the diol is 6000 or more and 20000 or less.

4. The resin composition according to claim 1, wherein the diol is polypropylene glycol.

5. The resin composition according to claim 1, wherein a number average molecular weight of the polyoxyalkylene monoalkyl ether is 2000 or more and 10000 or less.

6. The resin composition according to claim 1, wherein the polyoxyalkylene monoalkyl ether is polyoxypropylene monobutyl ether.

7. The resin composition according to claim 1, wherein a content of the monofunctional urethane (meth)acrylate is 10 parts by mass or more and 70 parts by mass or less based on 100 parts by mass of the total amount of the resin composition.

8. The resin composition according to claim 1, wherein the photopolymerizable compound further comprises an N-vinyl compound.

9. A method for producing the resin composition according to claim 1, comprising:

a step of reacting a diol, a diisocyanate, and a hydroxyl group-containing (meth)acrylate to synthesize a difunctional urethane (meth)acrylate;

a step of reacting a polyoxyalkylene monoalkyl ether, a diisocyanate, and a hydroxyl group-containing (meth) acrylate or reacting a polyoxyalkylene monoalkyl ether and an isocyanate group-containing (meth)acrylate to synthesize a monofunctional urethane (meth)acrylate; and a step of mixing a photopolymerizable compound comprising the difunctional urethane (meth)acrylate and the monofunctional urethane (meth)acrylate with a photopolymerization initiator to prepare a resin composition.

10. An optical fiber, comprising:

a glass fiber comprising a core and a cladding;

a primary resin layer coating the glass fiber in contact with the glass fiber; and a secondary resin layer coating the primary resin layer, wherein the primary resin layer comprises a cured material of the resin composition according to claim 1.

11. A method for producing an optical fiber, comprising:

an application step of applying the resin composition according to claim 1 to a periphery of a glass fiber comprising a core and a cladding; and a curing step of curing the resin composition by irradiation with ultraviolet rays after the application step.

12. An optical fiber ribbon, wherein a plurality of the optical fibers according to claim 10 are arranged in parallel and coated with a resin for a ribbon.

13. An optical fiber cable, wherein the optical fiber ribbon according to claim 12 is accommodated in a cable.

14. An optical fiber cable, wherein a plurality of the optical fibers according to claim 10 are accommodated in a cable.

* * * * *